US008558807B2

(12) United States Patent
Lin

(10) Patent No.: US 8,558,807 B2
(45) Date of Patent: Oct. 15, 2013

(54) TRANSPARENT TOUCH PANEL

(76) Inventor: Teh-Zheng Lin, Taoyuan (TW)

(*) Notice: Subject to any disclaimer, the term of this patent is extended or adjusted under 35 U.S.C. 154(b) by 238 days.

(21) Appl. No.: 13/027,284

(22) Filed: Feb. 15, 2011

(65) Prior Publication Data

US 2012/0206376 A1 Aug. 16, 2012

(51) Int. Cl.
*G06F 3/041* (2006.01)
(52) U.S. Cl.
USPC ........................ 345/173; 345/176; 178/18.01
(58) Field of Classification Search
USPC ...................... 345/173–179; 178/18.01–18.09
See application file for complete search history.

(56) References Cited

U.S. PATENT DOCUMENTS

| 5,218,351 A * | 6/1993 | Hashikawa ...................... 345/30 |
| 2006/0157289 A1 * | 7/2006 | Chou ........................... 178/18.01 |
| 2010/0182253 A1 * | 7/2010 | Park et al. ...................... 345/173 |
| 2011/0242017 A1 * | 10/2011 | Kang et al. ..................... 345/173 |

* cited by examiner

*Primary Examiner* — Amare Mengistu
*Assistant Examiner* — Premal Patel

(57) ABSTRACT

A transparent touch panel comprises a first axis sensing layer, a second axis sensing layer and an insulating layer between the first axis sensing layer and the second axis sensing layer; the first axis sensing layer and second axis sensing layer being transparent conductive films, and the insulating layer being transparent insulated film. In each of the first axis sensing layer and second axis sensing layer, first insulating wires serve to delimit a plurality of electrode areas and a plurality of waste etching areas; and signal conductive wires serve to delimit a dummy pattern in the waste etching areas; the electrodes areas include a plurality of sensing electrodes and/or a plurality of signal conductive wires and the dummy pattern includes a plurality of small sub-areas which are disconnected to each other.

8 Claims, 4 Drawing Sheets

TRANSPARENT TOUCH PANEL

FIELD OF THE INVENTION

The present invention relates to a transparency touch panel, and in particular to a transparent touch panel of which the transmittance distribution is uniform on the whole plane so as to reduce the noise in the image.

BACKGROUND OF THE INVENTION

Transparency touch panel is used to cover the display screen of an electronic device for interactive inputting so as to improve the interaction between the user and the device in an efficiency way. A touch panel is made of sensors, a control panel and other software. Based on the operation principle and the structure, the touch panels are classified as resistive, capacitive, infrared and supersonic touch panels, etc. However currently, capacitive touch panels with multiple sensing points are the main trend in the improvement of the touching sensing effect, cracking-proof and wearing-proof because it uses the function of single point sensing. Generally, a capacitive touch panel has two transparent conductive films which are insulated from one another, such as made of ITO. Each film has a desire electrode pattern to form as a plurality of X traces and Y traces. The undesired portions on the film are etched out to form with the traces and these traces are isolated with a predetermined width. However, the electrode areas and waste etching areas (hollow portion on the conductive film) have different transmittances. Thus the light passing through the film is non-uniformly deflected so that an apparent pattern is generated, which can be viewed by the viewers. Especially, when the touch panel is arranged in front of the screen, the image passing through the screen will deform and distort. To avoid above mentioned defects, in some ways, the material in the waste etching area is retained for reduction of the differences of transmittances in different parts. Above mentioned way will cause the transmittances in different parts of the film become more uniform. However, if the layout of the pattern in the waste etching area is not a preferred one, such as the area is too large, or the insulation is not preferred, etc., noise and EMI (electromagnetic interference) will generate so that the sensing signals in the electrode areas are interfered or noise and error signals are generated, even the all sensors are not used.

SUMMARY OF THE INVENTION

Accordingly, the object of the present invention is to provide an advanced transparent touch panel. Fine insulation wires are used to confine the boundaries of a plurality of electrodes in a transparent conductive film. The non-electrode areas are formed with a plurality of disconnected areas so that the whole surface of the transparent touch panel is flat and thus has uniform transmittance distribution. Moreover, the capacitance for noise in the waste etching areas is reduced to have preferred electric property.

To achieve above objects, the present invention provides a transparent touch panel comprising: a first axis sensing layer, a second axis sensing layer and an insulating layer between the first axis sensing layer and the second axis sensing layer; the first axis sensing layer and second axis sensing layer being transparent conductive films, and the insulating layer being transparent insulated film; and wherein in each of the first axis sensing layer and second axis sensing layer, first insulating wires serve to delimit a plurality of electrode areas and a plurality of waste etching areas; and signal conductive wires serve to delimit a dummy pattern in the waste etching areas; the electrodes areas include a plurality of sensing electrodes and/or a plurality of signal conductive wires and the dummy pattern includes a plurality of small sub-areas which are disconnect to each other.

The sub-area is selected from one of triangular shapes, rectangular shapes, trapezoidal shapes, oblong shapes, polygonal shapes, round shape and other geometrical shapes. The dummy pattern is formed by one or a plurality of geometrical shapes.

Each first insulating wire is a hollow trench and has a line width smaller than 200 μm with depth thereof being completely cut off the transparent conductive film so as to cut the film into two independent parts. Each second insulating wire is a hollow trench and has a line width smaller than 200 μm with depth thereof being completely cut off the transparent conductive film so as to cut the film into two independent parts.

It should be noted that all the sensing layers are made of conductive transparent films selected from Indium Tin Oxide (ITO), Indium Zinc Oxide (IZO), Aluminum Zinc Oxide (AZO) or PEDOT, etc. However this is not used to confine the scope of the present invention.

It should be noted that the insulated layer is selected from an insulated hard thin plate, a soft thin film and an insulated transparent gluing layer or the combination thereof. The insulated hard thin plate or the soft thin film is a plane or non-plane thin film which are SiO2, or PC, or PET, or PMMA or COC, etc, however these materials are not used to confine the scope of the present invention. All kinds of hard or soft materials are also suitable in the present invention. The transparent gluing layer has material selected from UV adhesive, Optically Clear Adhesive (OCA) or Isoprene Rubber, etc. However this is not used to confine the scope of the present invention.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

In the embodiment, a capacitive touch panel is used as an example, however the scope of the present invention is not only confined to the capacitive touch panel, other touch panels, such as resistive touch panels, and electromagnetic touch panels, are also suitable in the present invention.

Figure 1:
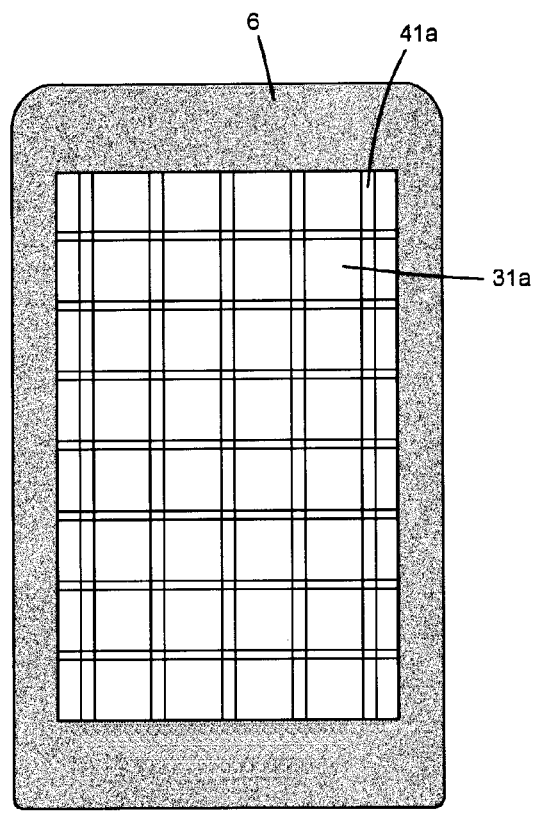
FIG. 1 is a plane view showing the elements of the present invention.
Figure 2:
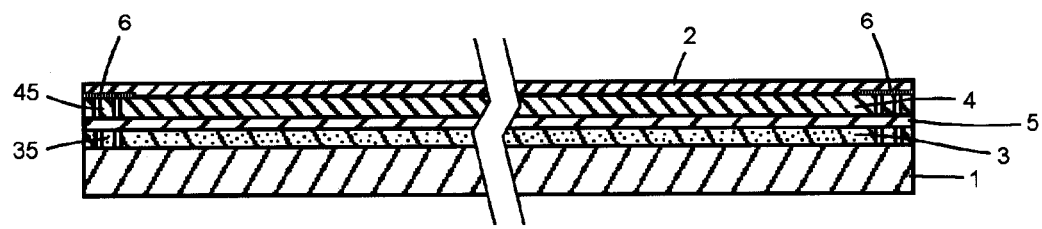
FIG. 2 is a lateral cross sectional view of the elements of the present invention.

Referring to FIGS. 1 and 2, a preferred embodiment of the present invention is illustrated. The capacitive touch panel of the present invention includes a lower substrate 1 and an upper panel 2. An upper side of the lower substrate 1 is installed with a lower capacitive sensing layer 3 and a lower side of the upper panel 2 is installed with an upper capacitive sensing layer 4. A gluing layer 5 serves to glue the lower capacitive sensing layer 3 and the upper capacitive sensing layer 4 so as to the whole structure is formed as a transparent panel. The material of the gluing layer 5 is selected from highly transparency glass film or polyester film. The gluing layer 5 is an insulated transparent UV glue.

Figure 4:
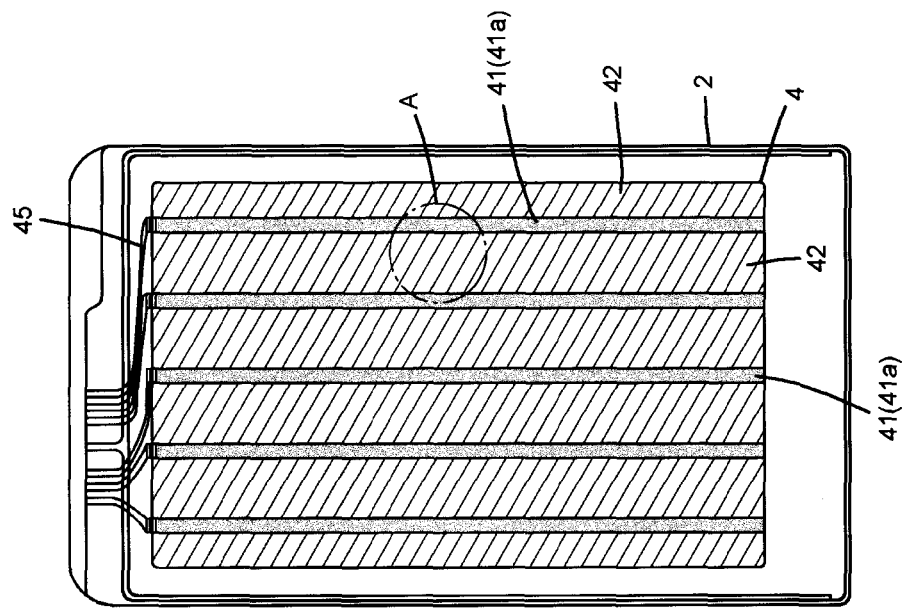
FIG. 4 is a plane view about the upper plane of the embodiment of the present invention.
Figure 3:
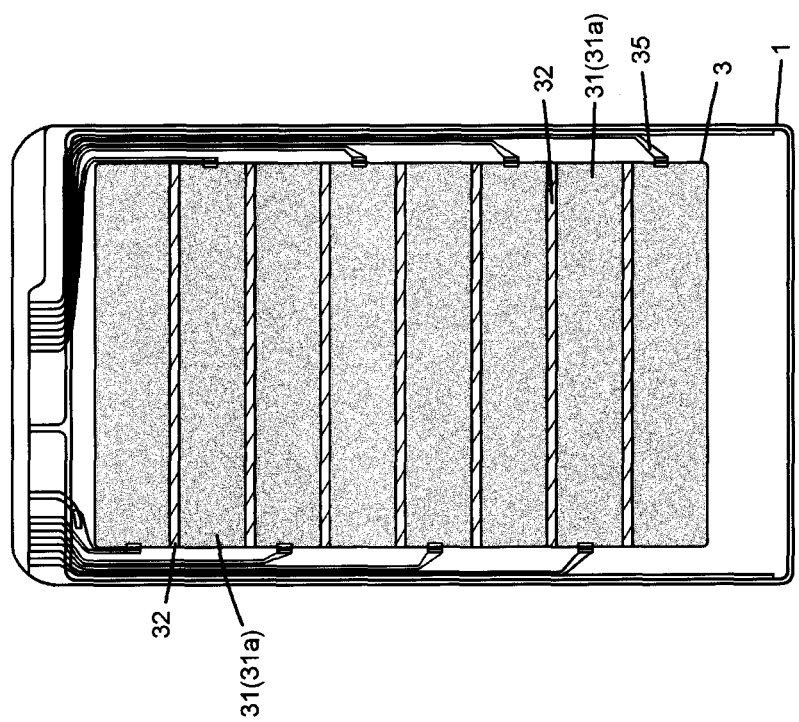
FIG. 3 is a plane view about the lower substrate of the present invention.
Figure 5:
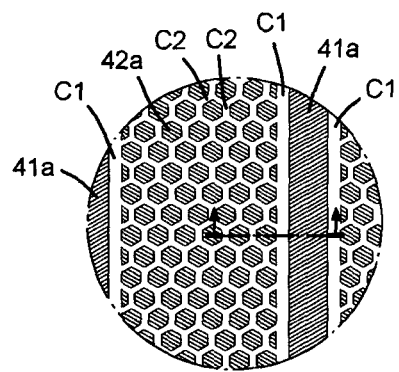
FIG. 5 is an enlarged view of part A in FIG. 4.

With reference to FIG. 3, the lower capacitive sensing layer 3 is an ITO (Indium Tin Oxide) transparent conductive film. The lower capacitive sensing layer is etched to form with a plurality of fine trenches so as to form with electrode areas 31 and waste etching areas 32. Each waste etching area 32 is formed with a dummy pattern. Each electrode area 31 is formed as an X trace 31a so that all X traces 31a are formed as a matrix. One end of each X trace 31a is electrically connected to a respective signal conductive wire 35 at an edge of the lower substrate 1. Similarly, as illustrated in FIG. 4, the upper capacitive sensing layer 4 at the lower surface of the upper panel 2 is etched to form with a plurality of fine trenches so as to form with a plurality of electrode areas 41 and a plurality of waste etching areas 42 which are isolated by a plurality of first insulating wires C1. Each waste etching area 42 is formed with a dummy pattern by a plurality of second insulating wires C2. Each electrode area 41 is formed as a Y trace 42a. All the Y traces 42a are parallel. One end of each Y trace 42a is connected to one end of a signal conductive wire 45 at the edge of the lower substrate 1. In this embodiment, the dummy pattern is formed with a plurality of hexagonal areas 42a. Each first insulating wire C1 is a hollow trench and has a line with of about 50 μm. Each second insulating wire C2 is a hollow trench and has a line with of about 30 μm with depth thereof being completely cut off the transparent conductive film so as to cut the film into two independent parts (referring to FIG. 6).

With reference to FIGS. 1 and 2, it is illustrated that a non-transparent colored frame 6 is formed between the upper panel 2 and the upper capacitive sensing layer 4. The frame 6 is installed at an edge area of a lower surface of the upper panel 2 and is formed by metal sputtering for shielding the signal conductive wires 35 and 45 at the edge of the lower substrate 1.

In assembly of above mentioned elements, the gluing layer 5 serves to glue the lower capacitive sensing layer 3 and the upper capacitive sensing layer 4 so that the whole structure is formed as a transparent panel. The Y traces 42a and the X traces 31a are orthogonally arranged so that the sensing signals from the Y traces 42a and X traces 31a can be transferred out through the signal conductive wires 35 and 45 for further processing.

In the present invention, by the dummy patterns on the waste etching areas 32 and 42 of the transparent conductive films, the hollow portions in the capacitive sensing layers 3 and 4 only occupy a small part so that the touch panel has a flat plane and has uniform transmittance distribution to present a clear image with less distortion and without noise. Moreover, the disconnected dummy pattern is helpful to the reduction of noise and interference of signals.

Figure 6:
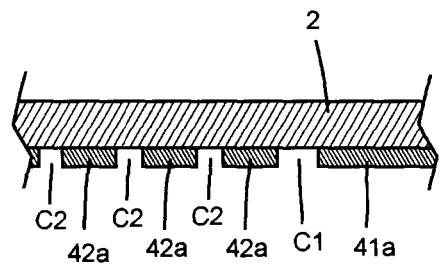
FIG. 6 is a lateral cross sectional view along a cut line in FIG. 5.
Figure 7:
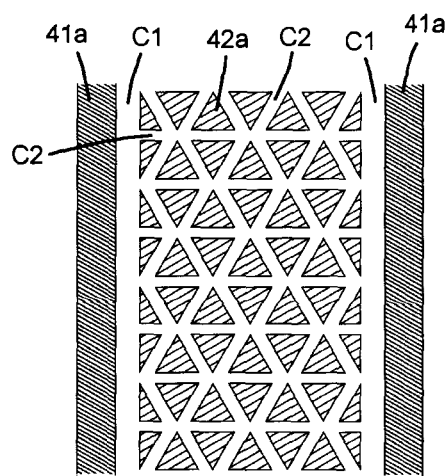
FIG. 7 is a schematic view about a layout of another dummy pattern of the waste etching areas.
Figure 8:
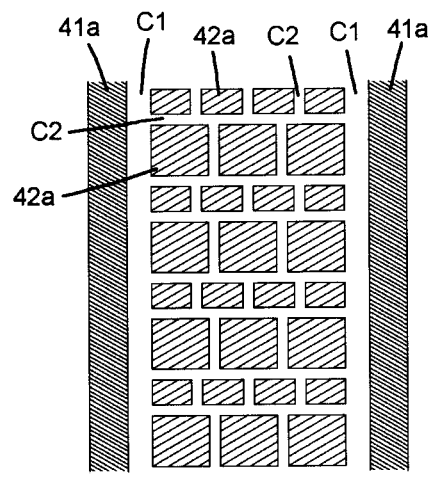
FIG. 8 is a schematic view showing another layout of the dummy pattern in the waste etching areas.
Figure 9:
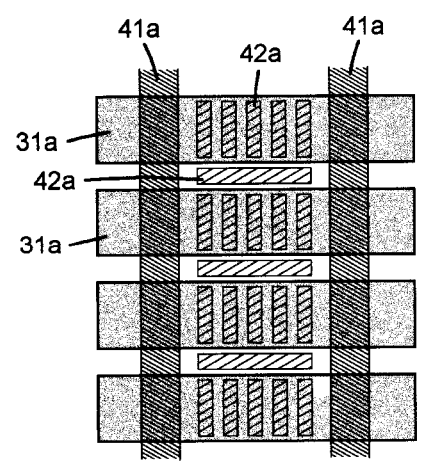
FIG. 9 is a further view showing another layout of the dummy pattern in the waste etching areas, wherein a plurality of dummy layers can be overlapped.

However the present invention is not confined to the above structure, other modifications and variations are also suitable to the present invention, such as the hexagonal areas in the dummy pattern can be changed to other shapes, such as triangular shapes illustrated in FIG. 6, or rectangular shapes in FIG. 8, oblong shapes, polygonal shapes, round shapes, etc or the combination thereof. All there are within the scope of the present invention. Moreover, as illustrated in FIG. 9, a further sensing layer can be overlapped thereto.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A transparent touch panel comprising: a first axis sensing layer, a second axis sensing layer and an insulating layer between the first axis sensing layer and the second axis sensing layer; the first axis sensing layer and second axis sensing layer being transparent conductive films, and the insulating layer being transparent insulated film; and wherein in each of the first axis sensing layer and second axis sensing layer, first insulating wires serve to delimit a plurality of electrode areas and a plurality of waste etching areas; and a plurality of signal conductive wires serve to delimit a dummy pattern in each of the waste etching areas; the electrodes areas include a plurality of sensing electrodes and/or a plurality of signal conductive wires and the dummy pattern includes a plurality of small sub-areas which are disconnected to each other; and each first insulating wire is a hollow trench and has a line width smaller than 200 μm with depth thereof being completely cut off the transparent conductive film so as to divide the film into two independent parts.

2. The transparent tough panel as claimed in claim 1, wherein the sub-area is selected from one of triangular shapes, rectangular shapes, trapezoidal shapes, oblong shapes, polygonal shapes, round shape and other geometrical shapes.

3. The transparent tough panel as claimed in claim 2, wherein the dummy pattern is formed by one or a plurality of geometrical shapes.

4. The transparent tough panel as claimed in claim 1, wherein each second insulating wire is a hollow trench and has a line width smaller than 200 μm with depth thereof being completely cut off the transparent conductive film so as to divide the film into two independent parts.

5. The transparent tough panel as claimed in claim 1, wherein all the sensing layers are made of conductive transparent films selected from Indium Tin Oxide (ITO), Indium Zinc Oxide (IZO), Aluminum Zinc Oxide (AZO) or PEDOT.

6. The transparent tough panel as claimed in claim 1, wherein the insulated layer is selected from an insulated hard thin plate, a soft thin film and an insulated transparent gluing layer or the combination thereof.

7. The transparent tough panel as claimed in claim 6, wherein the insulated hard thin plate and the soft thin film is selected from SiO2, polycarbonate (PC), polyester (PET), polymethyl methacrylate (PMMA) and Cyclo Olefin Copolymer (COC).

8. The transparent tough panel as claimed in claim 6, wherein the transparent gluing layer has material selected from UV adhesive, optically clear Adhesive (OCA) and Isoprene Rubber.

* * * * *